(12) United States Patent
Roberts

(10) Patent No.: US 9,325,495 B2
(45) Date of Patent: Apr. 26, 2016

(54) ENCRYPTED SERVER-LESS COMMUNICATION BETWEEN DEVICES

(71) Applicant: Empire Technology Development LLC, Wilmington, DE (US)

(72) Inventor: Michael John Roberts, Jamberoo (AU)

(73) Assignee: Empire Technology Development LLC, Wilmington, DE (US)

( * ) Notice: Subject to any disclaimer, the term of this patent is extended or adjusted under 35 U.S.C. 154(b) by 0 days.

(21) Appl. No.: 14/372,294

(22) PCT Filed: Nov. 8, 2013

(86) PCT No.: PCT/US2013/069157
§ 371 (c)(1),
(2) Date: Jul. 15, 2014

(87) PCT Pub. No.: WO2015/069274
PCT Pub. Date: May 14, 2015

(65) Prior Publication Data
US 2015/0256338 A1  Sep. 10, 2015

(51) Int. Cl.
| | |
|---|---|
| G06F 21/00 | (2013.01) |
| H04L 9/32 | (2006.01) |
| H04L 9/08 | (2006.01) |
| H04L 29/06 | (2006.01) |
| H04W 12/02 | (2009.01) |
| G06F 11/30 | (2006.01) |
| G06F 12/14 | (2006.01) |

(52) U.S. Cl.
CPC ............... *H04L 9/0861* (2013.01); *H04L 9/32* (2013.01); *H04L 63/0435* (2013.01); *H04W 12/02* (2013.01); *H04L 2209/805* (2013.01)

(58) Field of Classification Search
None
See application file for complete search history.

(56) References Cited

U.S. PATENT DOCUMENTS

| | | | |
|---|---|---|---|
| 6,978,378 B1 | 12/2005 | Koretz | |
| 2009/0169018 A1* | 7/2009 | Deisher | 380/278 |
| 2009/0214028 A1* | 8/2009 | Schneider | 380/44 |
| 2010/0306635 A1* | 12/2010 | Tang et al. | 714/807 |
| 2011/0010551 A1* | 1/2011 | Razzell | 713/171 |
| 2013/0171935 A1 | 7/2013 | Tsai et al. | |
| 2013/0231054 A1* | 9/2013 | Fry | 455/41.2 |
| 2014/0173291 A1* | 6/2014 | Johnson | 713/189 |

OTHER PUBLICATIONS

"CardShake(business card, NFC)," Tesla System Co., Ltd., accessed on May 8, 2013, p. 1.
"Crest factor," Wikipedia, http://web.archive.org/web/20130607015829/http://en.wikipedia.org/wiki/Crest_factor, Last modified on Jun. 5, 2013, pp. 5.
International Search Report and Written Opinion for International Application No. PCT/US2013/069157, mailed on Apr. 4, 2014.

(Continued)

*Primary Examiner* — Shin-Hon Chen
(74) *Attorney, Agent, or Firm* — Brundidge & Stanger, P.C.

(57) ABSTRACT

In some examples, a device may include an accelerometer configured to provide a measurement of vibration created by relative contact with another device, and a processor, operatively coupled to the accelerometer, configured to: create an encryption key based on, at least, the measurement of the vibration, receive an output encrypted with the encryption key from the another device, and verify the identity of the encryption key by which the output received from the another device is encrypted.

25 Claims, 6 Drawing Sheets

(56) References Cited

OTHER PUBLICATIONS

Mathur, S., et al., "ProxiMate: Proximity-based Secure Pairing using Ambient Wireless Signals," MobiSys '11 Proceedings of the 9th international conference on Mobile systems, pp. 211-224, ACM (2011).

Stigge, M., et al., "Reversing CRC—Theory and Practice," Humboldt University Berlin, pp. 1-24 (2006).

* cited by examiner

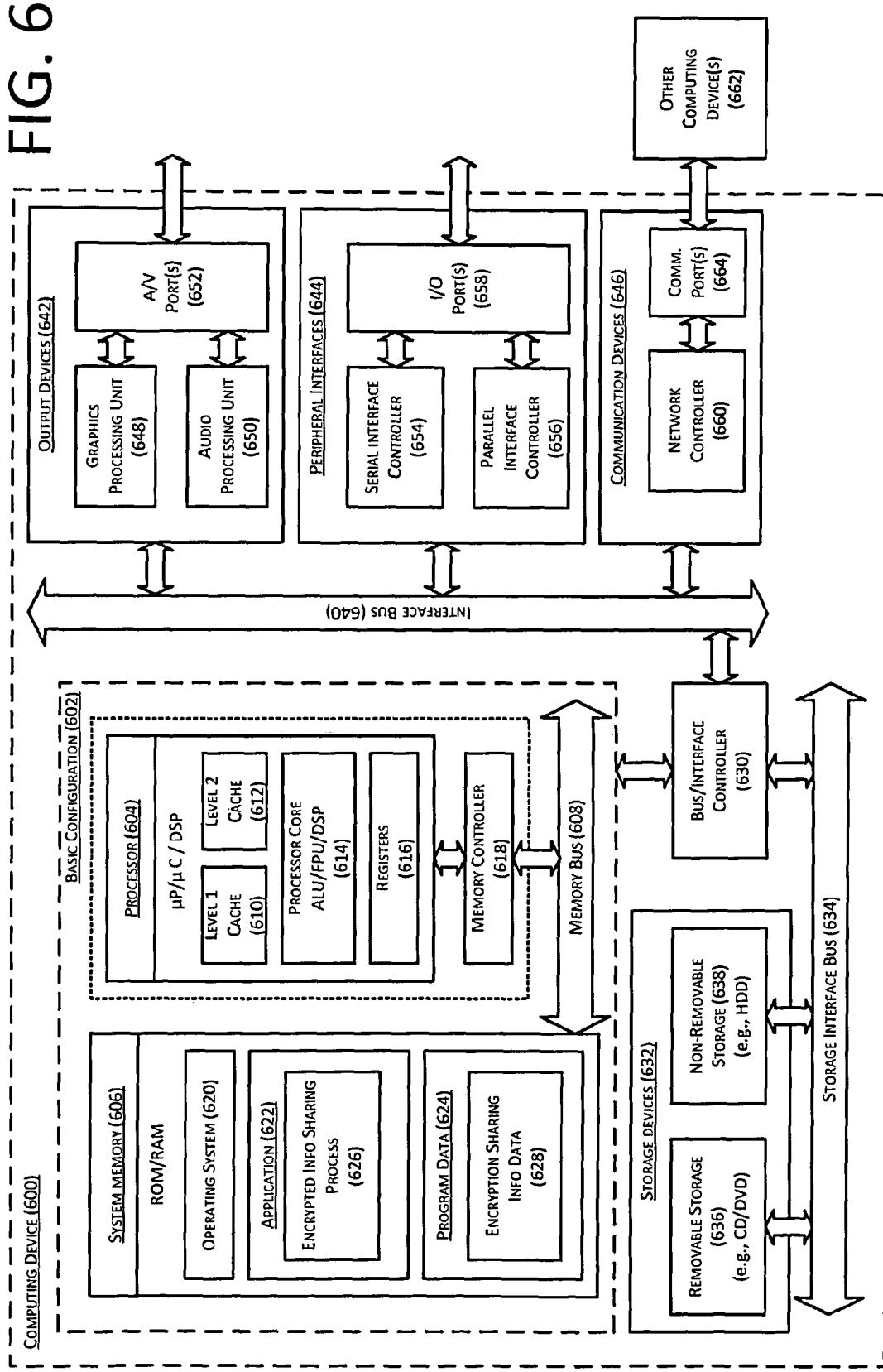

US 9,325,495 B2

ENCRYPTED SERVER-LESS COMMUNICATION BETWEEN DEVICES

CROSS-REFERENCE TO RELATED APPLICATION

This application is the National Stage filing under 35 U.S.C. §371 of PCT Application No. PCT/US2013/69157, filed on Nov. 8, 2013.

TECHNICAL FIELD

The embodiments described herein pertain generally to transferring information between devices using an encryption key without exposing either the encryption key or the underlying messages.

BACKGROUND

Unless otherwise indicated herein, the approaches described in this section are not prior art to the claims in this application and are not admitted to be prior art by inclusion in this section.

Transferring information between devices, such as handheld wireless devices, has become commonplace. In particular, the increase of functionality in smartphones and similar devices provides a growing ability to easily and securely transfer information. However, current technology relies on external support, frequently in the form of a server or other intermediary, to effect such transfers.

SUMMARY

In one example embodiment, a system may include a first device and a second device, each having an accelerometer and configured to: by the accelerometer, independently measure vibrations caused by a first relative contact and a second relative contact; calibrate the accelerometer based on vibration caused by the first relative contact measured by the accelerometers of both of the first and second devices; and independently create an identical encryption key based on vibration caused by the second relative contact respectively measured by the calibrated accelerometer.

In another example embodiment, a device may include an accelerometer configured to provide a measurement of vibration created by relative contact with another device, and a processor, operatively coupled to the accelerometer, configured to: create an encryption key based on, at least, the measurement of the vibration, receive an output encrypted with the encryption key from the another device, and verify the identity of the encryption key by which the output received from the another device is encrypted.

In yet another example embodiment, a method may include measuring a vibration created by relative contact with a device, creating an encryption key from the measured vibration, receiving an output from the device encrypted independently of the created encryption key, verifying an identity of encryption with the created encryption key and encryption with which the output from the device is encrypted, and transferring information encrypted with the created encryption key to the device.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

FIG. 6 shows a block diagram illustrating an example computing device by which various example solutions described herein may be implemented, arranged in accordance with at least some embodiments described herein.

DETAILED DESCRIPTION

Figure 1:
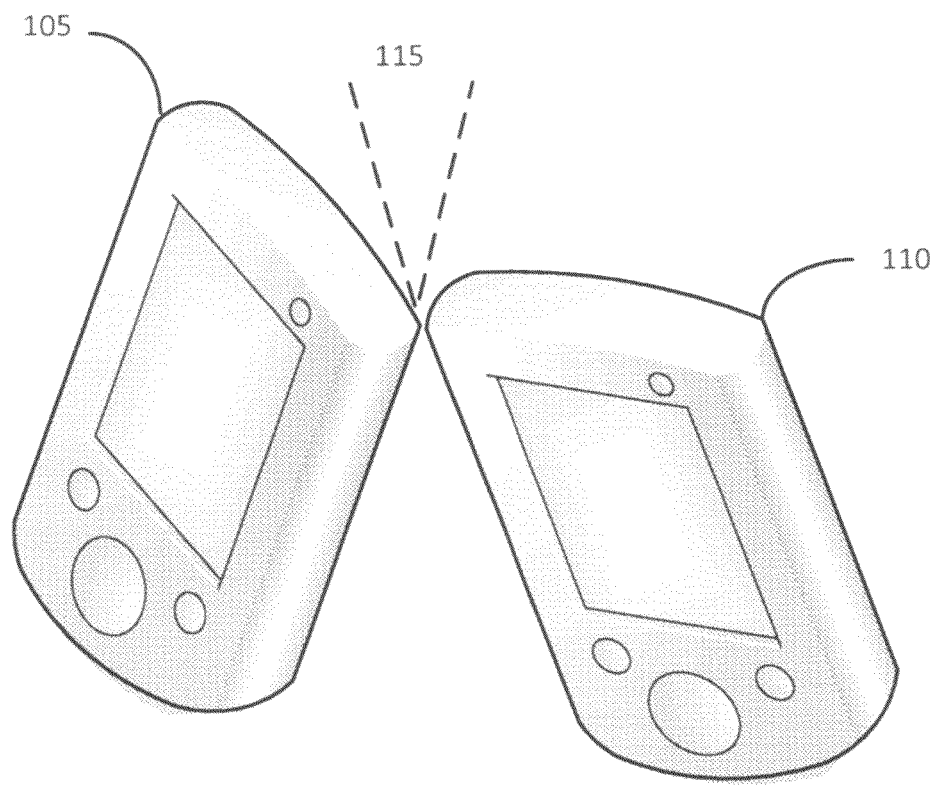
FIG. 1 shows an example configuration of two devices initiating encrypted server-less communication, arranged in accordance with at least some embodiments described herein.

In the following detailed description, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

FIG. 1 shows an example configuration 100 of two devices initiating encrypted server-less communication, arranged in accordance with at least some embodiments described herein. As depicted, configuration 100 includes, at least, a first device 105 and a second device 110 being brought into mutual contact (e.g., "knocked" together). First device 105 and second device 110 are depicted in FIG. 1 as handheld cellular telephones, but configuration 100 may pertain to any wired or wireless device configured to conduct encrypted communication there between. Other non-limiting examples for either or both of first device 105 and second device 110 may include a tablet computer, a laptop computer, a point-of-sale terminal, an automated teller machine (ATM), a resource-poor embedded device such as a wireless key, lock, or appliance control having no interface other than a simple communication interface (e.g., no display or keyboard/keypad), and equivalents thereof. In the context of configuration 100, a user (which may be a person or actor initiating or receiving a "knock" or "contact") may hold, manipulate, or otherwise control one or both of first device 105 and second device 110, including the act of creating at least an initial contact between first device 105 and second device 110.

Figure 2:
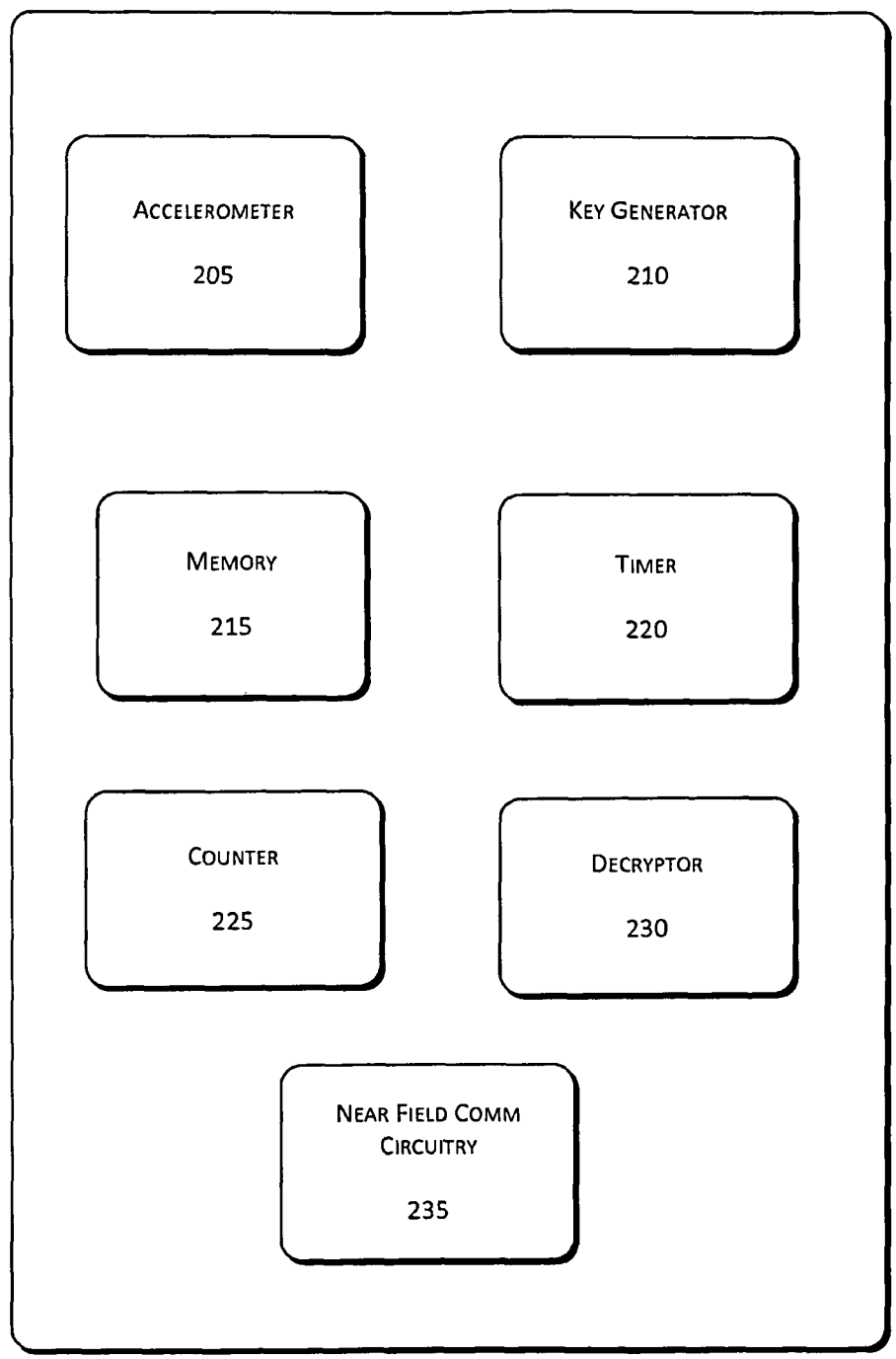
FIG. 2 shows an example configuration of a device with which encrypted server-less communication may be implemented, arranged in accordance with at least some embodiments described herein.

FIG. 2 shows an example configuration of a device 200 with which encrypted server-less communication may be implemented, arranged in accordance with at least some embodiments described herein. Device 200 may refer to either first device 105 or second device 110. As depicted, device 200 may be configured to include an accelerometer 205, a key generator 210, a memory 215, a timer 220, a counter 225, a decryptor 230, and Near Field Communication circuitry 235. Any one or more of accelerometer 205, key generator 210, memory 215, timer 220, counter 225, decryptor 230, and Near Field Communication circuitry 235 may be implemented as hardware, software, firmware, or any combination thereof.

Accelerometer 205 may refer to one or more components configured, designed, and/or programmed to sense acceleration of device 200 due to, for example, a knock with another device (e.g., first device 105 or second device 110). In some embodiments, accelerometer 205 may be implemented as a three-axis accelerometer in a mobile computing device using a same component that detects or determines the orientation of the mobile computing device to establish, for example, whether a portrait-oriented or a landscape-oriented display should be output.

Key generator 210 may refer to one or more components configured, designed, and/or programmed to generate an encryption key by which information may be encrypted for secure transfer between device 200 and another suitably configured device (e.g., first device 105 or second device 110). In some embodiments, key generator 210 may generate a measurable or detectable value from, e.g., a characteristic or feature of a waveform output by accelerometer 205. With reference to first device 105 and second device 110, first device 105 and second device 110 both include a key generator 210, and therefore both first device 105 and second device 110 may generate its own encryption key, and thus avoid the need to transfer a corresponding key to the other device. Details of key generator 210 are further discussed below with respect to FIG. 3.

Memory 215 may refer to any hardware and/or virtual component or components configured to store, e.g., executable instructions and/or data. For example, memory 215 may include system memory configured to store, inter alia, instructions for execution by one or more processors and the data with which those instructions work in carrying out functions of device 200. Memory 215 may also or alternatively include one or more storage devices for holding data for various purposes, including retrieval to system memory for use by the one or more processors.

Timer 220 may refer to one or more components configured to measure, output, or control timing of one or more components of device 200. For example, timer 220 may be implemented to determine the end of effectiveness of an encryption key generated by key generator 210.

Counter 225 may refer to one or more components configured to count a number of times an encryption key is utilized to transfer or receive encrypted information, relative to device 200. In this regard, as a non-limiting example, counter 225 may be implemented to determine the end of effectiveness of an encryption key generated by key generator 210.

Decryptor 230 may refer to one or more components configured to decrypt encrypted data, such as, by way of non-limiting example, encrypted information received by device 200.

Near Field Communication (NFC) circuitry 235 may refer to one or more components configured to facilitate communications according to an NFC standard.

Figure 3:
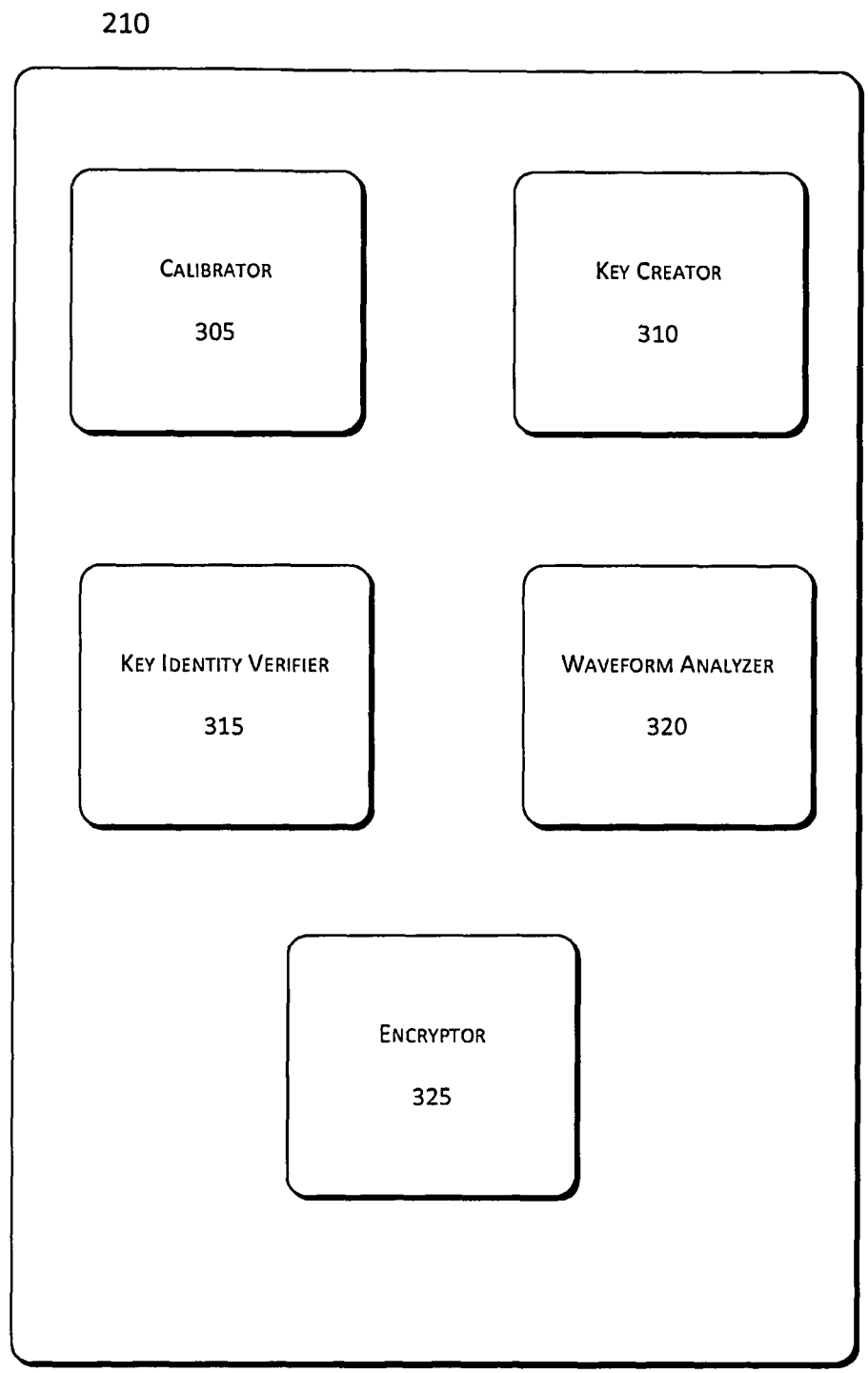
FIG. 3 shows an example configuration of a key generator that may be implemented in a device with which encrypted server-less communication may be implemented, arranged in accordance with at least some embodiments described herein.

FIG. 3 shows an example configuration of key generator 210 that may be implemented in device 200 with which encrypted server-less communication may be implemented, arranged in accordance with at least some embodiments described herein. As depicted, key generator 210 may be configured as hardware, software, and/or firmware, and includes a calibrator 305, a key creator 310, a key identity verifier 315, a waveform analyzer 320, and an encryptor 325.

Calibrator 305 may refer to one or more components configured, designed, and/or programmed to adjust a gain (e.g., gain setting) of accelerometer 205. With reference to first device 105 and second device 110, in some embodiments, calibrator 305 may adjust the gain of the output of accelerometer 205 corresponding to first device 105 to match the gain of the output of accelerometer 205 corresponding to second device 110 participating in the mutual contact or knock. Calibrator 305 may alternatively or additionally adjust one or more other features of the output of accelerometer 205 to match the corresponding feature of the output of accelerometer 205 of another suitably configured device.

Key creator 310 may refer to one or more components configured, designed, and/or programmed to generate at least portions of the encryption key. As noted above, the encryption key is generated within device 200 (e.g., both first device 105 and second device 110). Therefore, the encryption key need not be transferred between the devices participating in the encrypted server-less communication, such as, by way of example, first device 105 and second device 110. One of many benefits this provides is added security in that an eavesdropper cannot detect the encryption key from signals transferred between the devices participating in the encrypted server-less communication.

Waveform analyzer 320 may refer to one or more components configured, designed, and/or programmed to analyze impact waveforms output by accelerometer 205 due to contact with another suitably configured device. In some embodiments, waveform analyzer 320 may analyze a vibration waveform that may be generated by the force of an initial impact (first "knock") with another suitably configured device to determine whether and how to calibrate accelerometer 205.

Waveform analyzer 320 may be further configured, designed, and/or programmed to sample an impact waveform output by accelerometer 205 following a subsequent impact (second "knock") with the same suitably configured device that received the first knock. In some embodiments, key creator 310 may generate an encryption key from a desirable number of waveform peaks from the impact waveform sampling. As a non-limiting example, waveform analyzer 320 may sample the first 100 peaks at one-millisecond intervals and provide an output based on the sampling. Key creator 310 may thus generate the encryption key from the shape of the waveform to that point.

Key identity verifier 315 may refer to one or more components configured, designed, and/or programmed to verify identity of encryption keys generated by key creator 310 of each of the devices (e.g., first device 105 and second device 110) brought into mutual contact, individually. That is, key identity verifier 315 may verify that the encryption keys that are generated by the respective devices as the result of consecutive knocks are identical to each other. If the encryption keys are verified to be identical, then key identity verifier 315 may confirm that the process of generating the encryption keys from the mutual contact has been successful. That is, although the devices brought into mutual contact generate respective encryption keys independently, and neither encryption key is transferred from one device to the other, key identity verifier 315 may confirm that the generated encryption keys are identical.

In some embodiments, key identity verifier 315 may verify the success of a particular key generating process in device 200 (e.g., first device 105 and second device 110) by using the generated encryption key to encrypt a value from the vibration waveform which is substantially independent of negligible measurement differences (e.g., differences in measurement between the respective devices that fall within a predetermined tolerance). In accordance with at least one example, key identity verifier 315 may measure average time intervals between adjacent ones of the first four peaks of a vibration waveform. Once this average time interval is determined, encryptor 325 in device 200 (e.g., first device 105 and second device 110) may encrypt the average time interval using the encryption key, and first device 105 and second device 110 may exchange the encrypted average time intervals. If key identity verifier 315 determines that the average time intervals match, then the key generation process may be verified to be successful.

Figure 4:
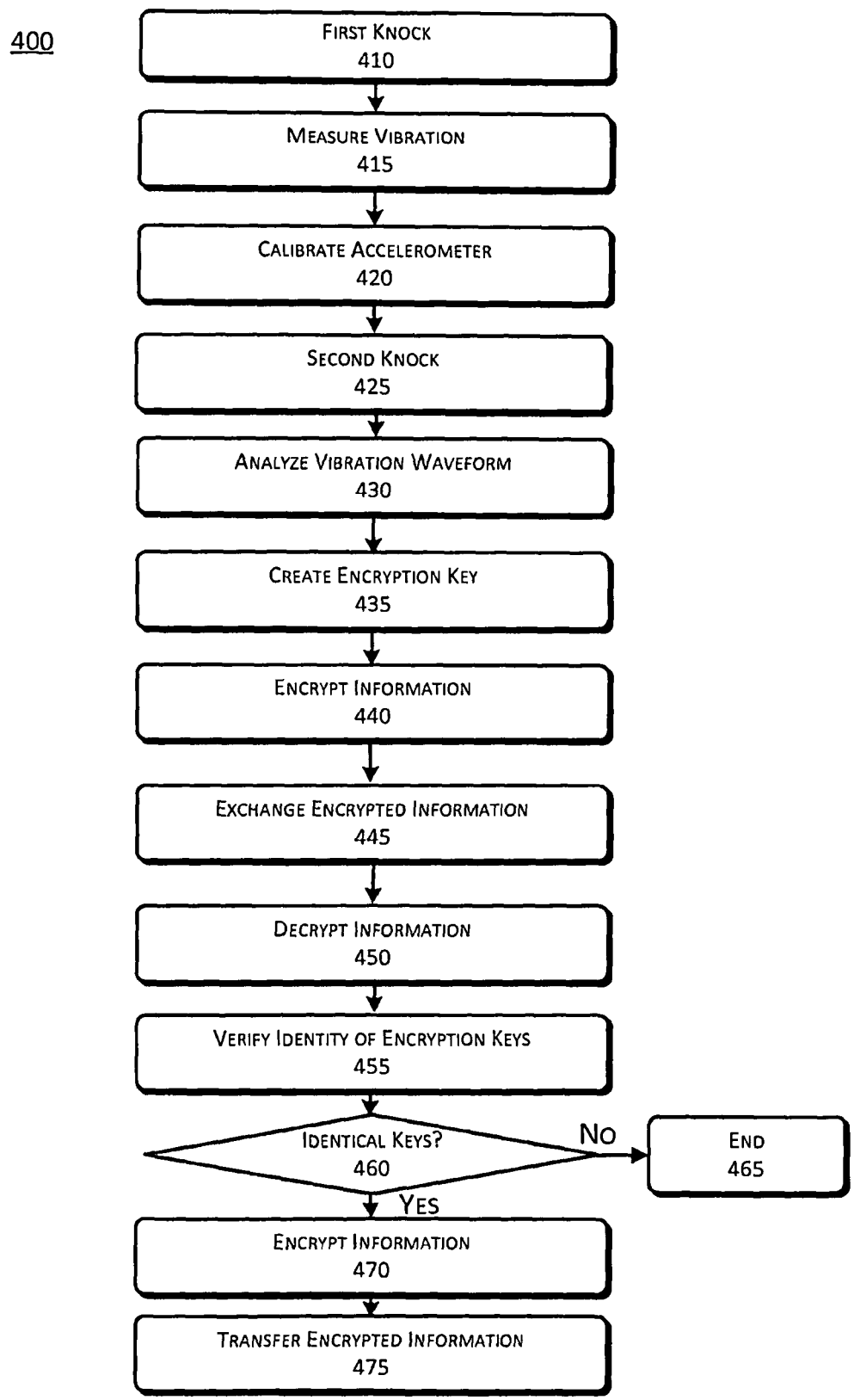
FIG. 4 shows a flow diagram illustrating an example processing flow by which a first device may transmit an encrypted server-less communication with a second device, arranged in accordance with at least some embodiments described herein.

FIG. 4 shows a flow diagram illustrating an example processing flow 400 by which a first device (e.g., first device 105) may conduct an encrypted server-less communication with a second device (e.g., second device 110), arranged in accordance with at least some embodiments described herein. Processing flow 400 may be implemented by first device 105. Further, processing flow 400 may include one or more operations, actions, or functions depicted by one or more blocks 410, 415, 420, 425, 430, 435, 440, 445, 450, 455, 460, 465, 470, and 475. Although illustrated as discrete blocks, various blocks may be divided into additional blocks, combined into fewer blocks, or eliminated, depending on the desired implementation.

Further, as set forth above, configuration 100, and therefore processing flow 400 as well, may each pertain to a device (e.g., first device 105) that is configured for encrypted communication with another device (e.g., second device 110) using an encryption key that is known to both devices, but that is generated independently by each of the communicating devices without the key being transferred from one device to the other device. Thus, users of the devices may easily and securely transfer information, such as photos, music, funds, etc., by the simple act of "knocking" the devices together, or by otherwise causing relative contact between the devices. Processing flow 400 may begin at block 410.

Block 410 (First Knock) may refer to bringing first device 105 into contact 115 with second device 110. Contact 115 may be initiated by either first device 105 or second device 110 against the other, or by mutual action. Further, contact 115 may be indirect, such as first device 105 contacting an intermediate object that is itself in direct contact with or housing second device 110. The person of ordinary skill in the art will conceive of other examples of contact 115. To the extent that such other examples of contact 115 set up vibrations that may be used to establish an encryption key or contribute to processing flow 400 in a manner similar to the utility of the vibrations from direct contact described herein, such other contact examples are considered to be within the understanding of block 410. Block 415 may follow block 410.

Block 415 (Measure Vibration) may refer to accelerometer 205 detecting a vibration caused by contact 115 between first device 105 and second device 110, and may also refer to waveform analyzer 320 measuring the vibration waveform output by accelerometer 205. Accordingly, accelerometer 205 and waveform analyzer 320 may be configured, designed, and/or programmed to collaboratively detect and measure vibrations caused by contact 115. Accelerometer 205 may respond to contact 115 by activating NFC circuitry 235 to output a query message to second device 110 to determine whether contact 115 was with second device 110. Accelerometer 205 may also provide a corresponding output to waveform analyzer 320 for analysis therein. Block 420 may follow block 415.

Block 420 (Calibrate Accelerometer) may refer to calibrating accelerometer 205 matching a characteristic of the vibration waveform output from accelerometer 205 of second device 110. In at least one embodiment, the query message output to second device 110 includes an RMS (root-mean-square) value of a first peak of the vibration waveform, which may be calculated by accelerometer 205. The RMS value may also serve as a basis for calibrator 305 of first device 105 determining whether calibrator 305 is to calibrate accelerometer 205. For example, if the RMS value of the first peak of the vibration waveform generated by first device 105 is less than the RMS value of the corresponding first peak generated by second device 110, calibrator 305 of first device 105 may adjust accelerometer 205 of first device 105 in accordance with the difference in RMS values between the respective first peaks. The output waveform peaks of accelerometers 205 of first device 105 and second device 110 are thus substantially matched by calibrator 305 of first device 105 calibrating accelerometer 205 of first device 105. Block 425 may follow block 420.

Block 425 (Second Knock) may refer to bringing first device 105 into a second contact 115 with second device 110, in a manner similar to that described above with respect to block 410 (First Knock), within a predetermined amount of time (e.g., one to two seconds) to, e.g., avoid ambiguity that might result if multiple second contacts 115 were to be detected by first device 105. Second contact 115 may be initiated by either first device 105 or second device 110, or by mutual action. Further, second contact 115 may be indirect as described above. Block 430 may follow block 425.

Block 430 (Analyze Vibration Waveform) may refer to waveform analyzer 320 analyzing the vibration waveform output by accelerometer 205 as a result of the second contact 115. For example, waveform analyzer 320 may sample the vibration waveform of second contact 115 until the vibration waveform fades (e.g., about one-tenth of a second, illustratively). The sampling may occur at one millisecond intervals, for example, yielding approximately 100 measurements within first device 105. A crest factor of the vibration waveform may be used to define the shape of the vibration waveform. Waveform analyzer 320 may calculate the crest factor from the peak amplitudes of the vibration waveform divided by the RMS value of the vibration waveform. This calculation provides a positive number that may be represented sufficiently in two bytes, although there is no limitation on the number of bytes. Block 435 may follow block 430.

Block 435 (Create Encryption Key) may refer to key creator 310 creating an encryption key in accordance with the vibration waveform analysis performed by waveform analyzer 320. In at least one embodiment, key creator 310 may create an encryption key based on the crest factor. For example, the crest factor itself may be adopted as the encryption key. Because first device 105 and second device 110 create the encryption key independently, the encryption key need not pass between the devices. Both first device 105 and second device 110 calculate the same encryption key. Block 440 may follow block 435.

Block 440 (Encrypt Information) may refer to encryptor 325 encrypting information for transfer to second device 110. For example, a feature of the vibration waveform may be encrypted for transfer. In at least one embodiment, the average of the respective time intervals between the first and second peaks, the second and third peaks, and the third and fourth peaks of the vibration waveform may be calculated and encrypted using the encryption key. Block 445 may follow block 440.

Block 445 (Exchange Encrypted Information) may refer to NFC circuitry 235 communicating the value of the average time interval encrypted in block 440 to second device 110. Block 450 may follow block 445.

Block 450 (Decrypt Information) may refer to decryptor 230 decrypting the encrypted information received from second device 110 using its own independently-created encryption key. Block 455 may follow block 450.

Block 455 (Verify Identity of Encryption Keys) may refer to key identity verifier 315 comparing the calculated average time interval of first device 105 with the now-decrypted average time interval received from second device 110. Decision block 460 may follow block 455.

Decision block 460 (Identical Keys?) may refer to key identity verifier 315 determining whether the result of its comparison indicates that the encryption keys are identical. That is, if the encryption keys are identical, the decrypted values will be equal or substantially so. Upon a negative determination (i.e., "NO" at decision block 460), block 465 may follow decision block 460; however, upon a positive determination (i.e., "YES" at decision block 460), block 470 may follow decision block 460.

Block 465 (End) may refer to the end of processing flow 400 upon a negative determination (i.e., "NO" at decision block 460).

Block 470 (Encrypt Information) may refer to encryptor 325 encrypting information to be transferred from first device 105 to second device 110 using the encryption key. For example, the user of first device 105 may desire to transfer a photograph, music, funds, or other information to second device 110. Such information is encrypted in block 470. Block 475 may follow block 470.

Block 475 (Transfer Encrypted Information) may refer to first device 105 transferring the encrypted photograph, music, funds, or other information in encrypted form to second device 110.

In at least one embodiment, the encryption key is not infinitely usable. That is, the system and method may be designed for the efficacy of the encryption key to expire or otherwise be unusable after a finite time or instances of encryption. Timer 220 may be employed to invalidate the encryption key after a preset time has elapsed from its creation. Alternatively or in addition, counter 225 may be employed to invalidate the encryption key after it has been used a preset number of times. Other modes of limiting the uses of the encryption key are also contemplated within the spirit and scope of the above.

Figure 5:
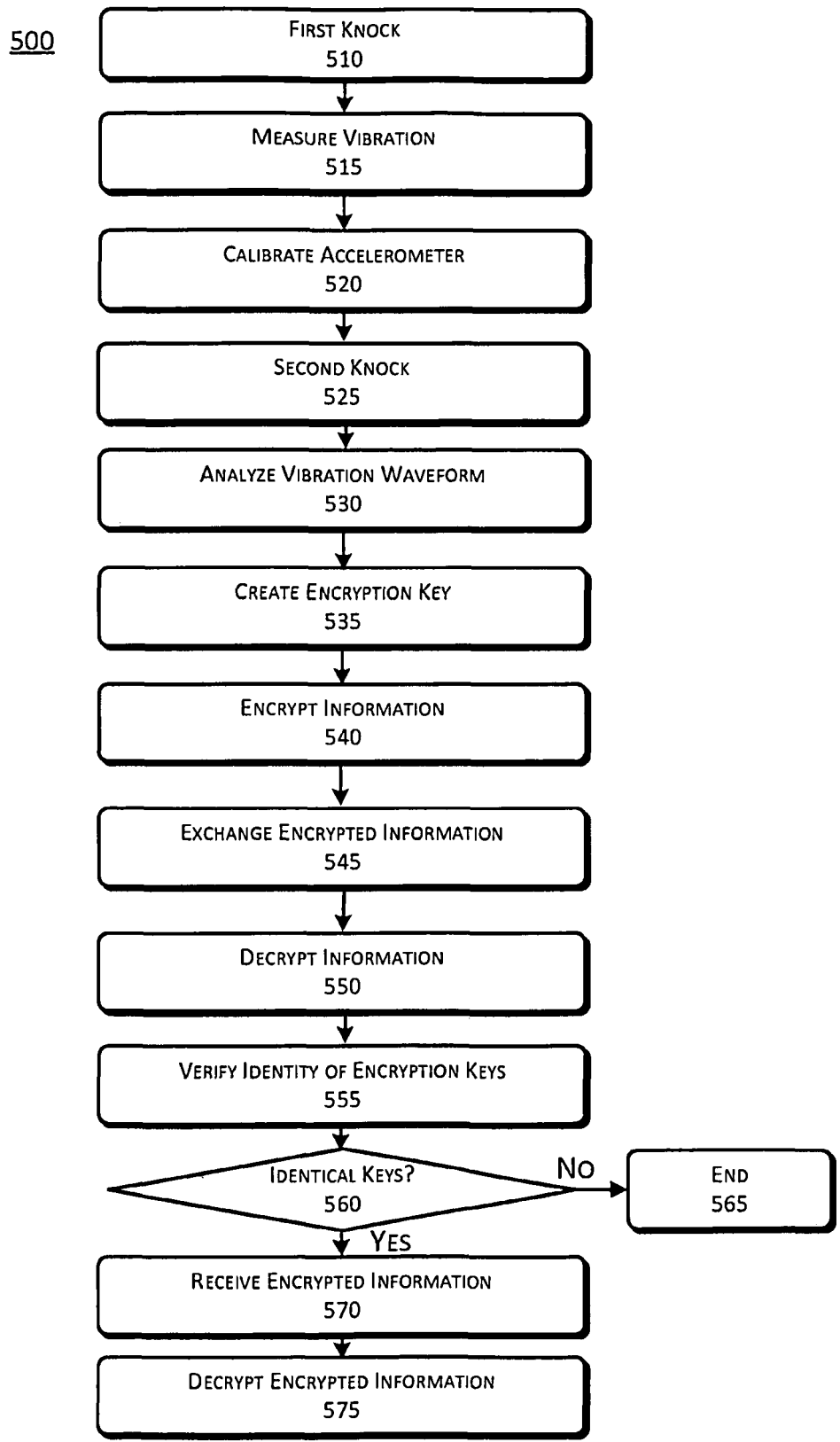
FIG. 5 shows another flow diagram illustrating an example processing flow by which the second device may return an encrypted server-less communication with the first device, arranged in accordance with at least some embodiments described herein.

FIG. 5 shows another flow diagram illustrating an example processing flow 500 by which the second device (e.g., second device 110) may return an encrypted server-less communication with the first device (e.g., first device 105), arranged in accordance with at least some embodiments described herein. Processing flow 500 may include one or more operations, actions, or functions depicted by one or more blocks 510, 515, 520, 525, 530, 535, 540, 545, 550, 555, 560, 565, 570, and 575. Many of these blocks correspond to blocks in processing flow 400, which describes processing implementing or implemented by first device 105 in at least one embodiment. Although illustrated as discrete blocks, various blocks of processing flow 500 may be divided into additional blocks, combined into fewer blocks, or eliminated, depending on the desired implementation.

Further, as set forth above, processing flow 500 may pertain to a device (e.g., second device 110) that is configured for encrypted communication with another device (e.g., first device 105) using an encryption key that is known to both devices, but that is generated independently by each of the communicating devices without the key being transferred from one device to the other device. Thus, users of the devices may easily and securely transfer information, such as photos, music, funds, etc., by the simple act of "knocking" the devices together, or by otherwise causing relative contact between the devices. Processing flow 500 may begin at block 510.

Block 510 (First Knock) may refer to bringing second device 110 into contact 115 with first device 105. The contact may be initiated by either device against the other, or by mutual action to cause the contact. Further, the contact could be indirect, such as by second device 110 contacting an intermediate object that is itself in direct contact with or housing first device 105, for example. The person of ordinary skill in the art will conceive of other contact examples. To the extent that such other contact examples set up vibrations that may be used to establish an encryption key or contribute to processing flow 500 in a manner similar to the utility of the vibrations from direct contact described herein, such other contact examples are considered to be within the understanding of block 510. Block 515 may follow block 510.

Block 515 (Measure Vibration) may refer to accelerometer 205 detecting vibration caused by contact 115 between second device 110 and first device 105, and may also refer to waveform analyzer 320 measuring the vibration waveform output by accelerometer 205. Accordingly, accelerometer 205 and waveform analyzer 320 may be configured, designed, and/or programmed to collaboratively detect and measure vibrations. Accelerometer 205 may respond to the impact by activating NFC circuitry 235 to output a query message to first device 105. Accelerometer 205 may also perform one or more of the measurement functions, and provide a corresponding output to waveform analyzer 320 for analysis therein. Block 520 may follow block 515.

Block 520 (Calibrate Accelerometer) may refer to calibrating accelerometer 205 to match a characteristic of the vibration waveform of accelerometer 205 of first device 105. In at least one embodiment, the query message includes the RMS value of the first peak of the vibration waveform, which may be calculated by accelerometer 205. The RMS value may also serve as a basis for determining whether calibrator 305 is to calibrate accelerometer 205. For example, if the RMS value of the first peak of the vibration waveform generated by second device 110 is less than the RMS value of the corresponding first peak generated by first device 105, calibrator 305 of second device 110 may adjust accelerometer 205 of second device 110 in accordance with the difference in RMS value between the respective first peaks. The output waveform peaks of accelerometers 205 of first device 105 and second device 110 are thus substantially matched by calibrator 305 of second device 110 calibrating accelerometer 205 of second device 110. Block 525 may follow block 520.

Block 525 (Second Knock) may refer to bringing second device 110 into a second contact 115 with first device 105, in a manner similar to that described above with respect to block 510 (First Knock), within a predetermined amount of time (e.g., one to two seconds) to, e.g., avoid ambiguity that might result if multiple occurrences of second contact 115 were to be detected by second device 110. Second contact 115 may be initiated by either second device 110 or first device 105, or by mutual action. Further, second contact 115 may be indirect as described above. Block 530 may follow block 525.

Block 530 (Analyze Vibration Waveform) may refer to waveform analyzer 320 analyzing the vibration waveform output by accelerometer 205 as a result of the second contact 115. For example, waveform analyzer 320 may sample the vibration waveform of second contact 115 until the vibration waveform fades (e.g., about one-tenth of a second, illustratively). The sampling may occur at one millisecond intervals, for example, yielding approximately 100 measurements within second device 110.

A crest factor of the vibration waveform may be used to define the shape of the vibration waveform. Waveform analyzer 320 may calculate the crest factor from the peak amplitude of the vibration waveform divided by the RMS value of the vibration waveform. This calculation provides a positive number that can be represented sufficiently in two bytes, although there is no limitation on the number of bytes. Block 535 may follow block 530.

Block 535 (Create Encryption Key) may refer to key creator 310 creating an encryption key in accordance with the vibration waveform analysis performed by waveform analyzer 320. In at least one embodiment, key creator 310 may create the encryption key based on the crest factor. For example, the crest factor itself may be adopted as the encryption key. Because second device 110 and first device 105 create the encryption key independently, the encryption key need not pass between the devices. Both second device 110 and first device 105 calculate the same encryption key. Block 540 may follow block 535.

Block 540 (Encrypt Information) may refer to encryptor 325 encrypting information for transfer to first device 105. For example, a feature of the vibration waveform may be encrypted for transfer. In at least one embodiment, the average of the respective time intervals between the first and second peaks, the second and third peaks, and the third and fourth peaks may be calculated and encrypted using the encryption key. Block 545 may follow block 540.

Block 545 (Exchange Encrypted Information) may refer to NFC circuitry 235 communicating the value of the average time interval encrypted in block 540 to first device 105. Block 550 may follow block 545.

Block 550 (Decrypt Information) may refer to decryptor 230 decrypting the encrypted information received from first device 105 using its own independently-created encryption key. Block 555 may follow block 550.

Block 555 (Verify Identity of Encryption Keys) may refer to key identity verifier 315 comparing the calculated average time interval of second device 110 with the now-decrypted average time interval received from first device 105. Decision block 560 may follow block 555.

Decision block 560 (Identical Keys?) may refer to key identity verifier 315 determining whether the result of its comparison indicates that the encryption keys are identical. That is, if the encryption keys are identical, the decrypted values will be equal or substantially so. Upon a negative determination (i.e., "NO" at decision block 560), block 565 may follow decision block 560; however, upon a positive determination (i.e., "YES" at decision block 560), block 570 may follow decision block 560.

Block 565 (End) may refer to the end of processing flow 500 upon a negative determination (i.e., "NO" at decision block 560).

Block 570 (Receive Encrypted Information) may refer to second device 110 receiving the encrypted photograph, music, funds, or other information transferred in encrypted form from first device 105 in block 475. Block 575 may follow block 570.

Block 575 (Decrypt Encrypted Information) may refer to decryptor 230 decrypting encrypted information received from first device 105 by second device 110 using the encryption key.

According to processing flows 400 and 500, by twice bringing first device 105 and second device 110 into mutual contact (e.g., by knocking them together twice), a process is set in motion by which information can be encrypted with an encryption key and transferred easily and securely between the devices without the need to transfer the encryption key from one device to another, and without an external server or other intermediary to effect the transfer.

Although various embodiments have been described above, further embodiments may be realized by modifications thereof. For example, although it is contemplated that the first and second knocks will occur in relatively quick succession (e.g., one to two seconds apart), the disclosed processing is not a function of the rapidity of the knocks. A shorter or longer interval may be suitable. Further, the calibration disclosed following the first knock may be performed with respect to features of the vibration other than signal level, and may concern features that are not directly measured by accelerometer 205. Indeed, one or both of first device 105 and second device 110 may be pre-calibrated such that additional calibration following the first knock is optional or unnecessary. In addition, although waveform analyzer 320 is described with respect to analyzing vibration waveforms of both the first and second knocks, separate analyzing components may perform these separate analyses. Further, Bluetooth or other wireless communication protocols may be employed in place of or in addition to the various Near Field Communications described above.

Additionally, although first device 105 and second device 110 are exemplified above as cellular telephones, the devices are not limited in this way. One or both of them may be a different device, for example and without limitation, a control for a household appliance (in which the transferred information may be energy usage or billing information, for example), a locking device for an automobile or entry door (in which the transferred information may be an activation or starter code), or an automated teller machine (ATM) (in which the transferred information may be account and/or funds information, or cash or equivalent).

In at least some embodiments, one or both of first device 105 and second device 110 may be configured for a verified identical encryption key establishing a link for future activity by an entity associated with the link. For example, a successful verification of an identical encryption key as described above may prepare or even form a secure bond, promise, relationship, link, etc. for one or more future exchanges. The future activity may include a plurality of information transfers, which may but need not be periodic (e.g., automatic payments on an installment plan). In other embodiments, the information transfers may be unidirectional (e.g., the real-time transfer of patient data) or bi-directional (the transfer of a service or goods for consideration). Other examples will become apparent to one of ordinary skill in the art upon reading and understanding these examples.

FIG. 6 shows a block diagram illustrating an example computing device by which various example solutions of transferring information between devices using an encryption key that can be used to encrypt messages to each other, without exposing either the encryption key or the underlying messages to interception by eavesdroppers, may be implemented, arranged in accordance with at least some embodiments described herein.

In a very basic configuration 602, computing device 600 typically includes one or more processors 604 and a system memory 606. A memory bus 608 may be used for communicating between processor 604 and system memory 606.

Depending on the desired configuration, processor 604 may be of any type including but not limited to a microprocessor ($\mu$P), a microcontroller ($\mu$C), a digital signal processor (DSP), or any combination thereof. Processor 604 may include one more levels of caching, such as a level one cache 610 and a level two cache 612, a processor core 614, and registers 616. An example processor core 614 may include an arithmetic logic unit (ALU), a floating point unit (FPU), a digital signal processing core (DSP Core), or any combination thereof. An example memory controller 618 may also be used with processor 604, or in some implementations memory controller 618 may be an internal part of processor 604.

Depending on the desired configuration, system memory 606 may be of any type including but not limited to volatile memory (such as RAM), non-volatile memory (such as ROM, flash memory, etc.) or any combination thereof. System memory 606 may include an operating system 620, one or more applications 622, and program data 624. Application 622 may include an encrypted information sharing process 626 that is arranged to perform the functions as described herein including those described with respect to processing flow 400 of FIG. 4 (by, e.g., first device 105) and processing flow 500 of FIG. 5 (by, e.g., second device 110). Program data 624 may include encryption information sharing data 628 that may be useful for operation with encrypted information sharing process 626 as described herein. In some embodiments, application 622 may be arranged to operate with program data 624 on operating system 620 such that implementations of information transfer using an encryption key that can be used to encrypt messages may be provided as described herein. This described basic configuration 602 is illustrated in FIG. 6 by those components within the inner dashed line.

Computing device 600 may have additional features or functionality, and additional interfaces to facilitate communications between basic configuration 602 and any required devices and interfaces. For example, a bus/interface controller 630 may be used to facilitate communications between basic configuration 602 and one or more data storage devices 632 via a storage interface bus 634. Data storage devices 632 may be removable storage devices 636, non-removable storage devices 638, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 606, removable storage devices 636 and non-removable storage devices 638 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

Computing device 600 may also include an interface bus 640 for facilitating communication from various interface devices (e.g., output devices 642, peripheral interfaces 644, and communication devices 646) to basic configuration 602 via bus/interface controller 630. Example output devices 642 include a graphics processing unit 648 and an audio processing unit 650, which may be configured to communicate to various external devices such as a display or speakers via one or more A/V ports 652. Example peripheral interfaces 644 include a serial interface controller 654 or a parallel interface controller 656, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device 646 includes a network controller 660, which may be arranged to facilitate communications with one or more other computing devices 662 over a network communication link via one or more communication ports 664.

The network communication link may be one example of a communication media. Communication media may typically be embodied by computer readable instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 600 may also be implemented as a server or a personal computer including both laptop computer and non-laptop computer configurations.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein may be implemented, e.g., hardware, software, and/or firmware, and that the preferred vehicle may vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes for system configuration 100 via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers, e.g., as one or more programs running on one or more computer systems, as one or more programs running on one or more processors, e.g., as one or more programs running on one or more microprocessors, as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium, e.g., a fiber optic cable, a waveguide, a wired communications link, a wireless communication link, etc.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors, e.g., feedback for sensing position and/or velocity; control motors for moving and/or adjusting components and/or quantities. A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Lastly, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

I claim:

1. A system, comprising:
   a first device and a second device, each having an accelerometer and configured to:
   by the accelerometer, independently measure vibration waveforms caused by a first relative contact between the first device and the second device and a second relative contact between the first device and the second device;
   calibrate the accelerometer based on a waveform characteristic variation of the vibration waveform caused by the first relative contact measured by the accelerometers of both of the first and second devices; and
   independently create an identical encryption key based on the vibration waveform caused by the second relative contact respectively measured by the calibrated accelerometer.

2. The system of claim 1, wherein the first device and the second device are each further configured to verify identity of the identical encryption key created by the first and second devices.

3. The system of claim 2, wherein at least one of the first device and the second device is further configured for a verified identical encryption key establishing a link for future activity by an entity associated with the link.

4. The system of claim 3, wherein the future activity includes a plurality of substantially periodic information transfers.

5. The system of claim 3, wherein the future activity includes a plurality of information transfers pursuant to an agreement.

6. A system, comprising:
   a first device including:
     a first accelerometer configured to provide a first measurement of a vibration waveform caused by a first relative contact with a second device, and a second measurement of a vibration waveform caused by a second relative contact with the second device, and
     a first processor, operatively coupled to the first accelerometer; and the second device including:
     a second accelerometer configured to provide a third measurement of the vibration waveform caused by the first relative contact with the first device, and a fourth measurement of the vibration waveform caused by the second relative contact with the first device, and
     a second processor, operatively coupled to the second accelerometer;
   wherein the first processor is configured to:
     calibrate the first accelerometer to compensate for a waveform characteristic variation between the first and third measurements of the vibration waveform caused by the first relative contact; and
     create an encryption key based on, at least, the second measurement of the vibration waveform caused by the second relative contact; and
   wherein the second processor is configured to:
     calibrate the second accelerometer to compensate for the waveform characteristic variation between the first and third measurements of the vibration waveform caused by the first relative contact, and
     create an encryption key identical to that created by the first processor based on, at least, the fourth measurement of the vibration waveform caused by the second relative contact.

7. The system of claim 6, wherein the first and second processors are each further configured to verify identity of the identical encryption key created by the first and second processors.

8. The system of claim 7, wherein at least one of the first processor and the second processor is further configured for a verified identical encryption key establishing a link for future activity by an entity associated with the link.

9. The system of claim 8, wherein the future activity includes a plurality of substantially periodic information transfers.

10. The system of claim 6,
    wherein the first and second devices are further configured to provide respective outputs encrypted with the identical encryption key; and
    wherein the first and second processors are each further configured to determine the waveform characteristic variation of the first and third measurements of the vibration waveform created by the first relative contact, using the respective encrypted output provided by the other.

11. The system of claim 6, wherein the first and second processors are each further configured for the first and second devices, respectively, to transfer information encrypted with the encryption key to each other without supplying the encryption key.

12. The system of claim 6, wherein at least one of the first and second devices further includes a timer configured to place a time limit on continuous effectiveness of the encryption key for encryption.

13. The system of claim 6, wherein at least one of the first and second devices further includes a counter configured to place a limit on a number of transfers of information encrypted with the encryption key.

14. A device, comprising:
    an accelerometer configured to provide a measurement of a vibration waveform created by relative contact between the device and another device; and
    a processor, operatively coupled to the accelerometer, configured to:
      create a first encryption key based on, at least, the measurement of the vibration waveform created by the relative contact;
      receive an output encrypted with a second encryption key from the another device, the second encryption key based on, at least, the relative contact; and
      verify that the first and second encryption keys are created by the relative contact.

15. The device of claim 14, wherein the processor is further configured for a verified identical encryption key establishing a link for future activity by an entity associated with the link.

16. The device of claim 15, wherein the future activity includes a plurality of information transfers.

17. The device of claim 15, wherein the future activity includes a plurality of information transfers pursuant to an agreement.

18. The device of claim 14, further comprising a timer configured to place a time limit on continuous effectiveness of the encryption key for encryption.

19. The device of claim 14, further comprising a counter configured to place a limit on a number of transfers of information encrypted with the encryption key.

20. The device of claim 14, wherein the processor is further configured to:
calibrate the accelerometer to compensate for a waveform characteristic variation of the vibration waveform measurement by the device and the another device.

21. A method, comprising:
measuring a vibration waveform created by relative contact between a first device and a second device;
creating an encryption key from the measured vibration waveform;
receiving an output from the second device encrypted independently of the created encryption key;
verifying an identity of encryption with the created encryption key and encryption with which the output from the second device is encrypted; and
transferring information encrypted with the created encryption key to the second device.

22. The method of claim 21, further comprising establishing a link for future activity by an entity associated with the link in accordance with a verified identical encryption key.

23. The method of claim 22, wherein the future activity includes a plurality of substantially periodic information transfers.

24. The method of claim 22, wherein the future activity includes a plurality of information transfers pursuant to an agreement.

25. The method of claim 21, further comprising calibrating the measuring of the vibration waveform to compensate for a difference between a waveform characteristic of the measurement of the vibration waveform and a waveform characteristic of a measurement of a vibration waveform by the second device created by the relative contact.

\* \* \* \* \*